United States Patent
Shigeeda et al.

(10) Patent No.: US 10,049,269 B2
(45) Date of Patent: Aug. 14, 2018

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Nobuyuki Shigeeda, Kanagawa (JP); Yozo Kashima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 36 days.

(21) Appl. No.: 15/097,948

(22) Filed: Apr. 13, 2016

(65) Prior Publication Data

US 2017/0091546 A1  Mar. 30, 2017

(30) Foreign Application Priority Data

Sep. 30, 2015 (JP) .................... 2015-192960
Oct. 23, 2015 (JP) .................... 2015-208927

(51) Int. Cl.
| | | |
|---|---|---|
| G06K 9/00 | (2006.01) | |
| H04N 1/00 | (2006.01) | |
| H04N 1/32 | (2006.01) | |

(52) U.S. Cl.
CPC ..... *G06K 9/00463* (2013.01); *G06K 9/00483* (2013.01); *H04N 1/00795* (2013.01); *H04N 1/32144* (2013.01); *G06K 2209/01* (2013.01); *H04N 2201/0082* (2013.01)

(58) Field of Classification Search
CPC .......... G06K 9/00463; G06K 9/00483; G06K 2209/01; H04N 1/00795; H04N 1/32144; H04N 2201/0082
See application file for complete search history.

(56) References Cited

U.S. PATENT DOCUMENTS

| | | | | |
|---|---|---|---|---|
| 2009/0125509 | A1* | 5/2009 | Takebe ................ | G06K 9/2081 |
| 2010/0223671 | A1* | 9/2010 | Tsuda ................... | G06F 21/554 |
| | | | | 726/26 |
| 2014/0019851 | A1* | 1/2014 | DeRoller ............. | G06F 17/243 |
| | | | | 715/243 |
| 2014/0019852 | A1* | 1/2014 | Numata ................. | G06F 17/24 |
| | | | | 715/255 |
| 2017/0091546 | A1* | 3/2017 | Shigeeda .......... | G06K 9/00463 |

FOREIGN PATENT DOCUMENTS

| | | |
|---|---|---|
| JP | 2003-109007 A | 4/2003 |
| JP | 2003-115028 A | 4/2003 |

* cited by examiner

*Primary Examiner* — Edward Park
(74) *Attorney, Agent, or Firm* — Oliff PLC (57) ABSTRACT

An information processing apparatus includes an acquiring unit, an extraction unit, and a selection unit. The acquiring unit acquires, for multiple documents, candidates for elements representing characteristics of each of the multiple documents. The extraction unit extracts, from the candidates acquired by the acquiring unit, common elements common to two or more of the multiple documents. The selection unit extracts, from the multiple documents, a document including two or more common elements among the common elements, and determines the two or more common elements included in the extracted document to be elements representing characteristics of the document.

6 Claims, 11 Drawing Sheets

FORM A-1

FILING DATE MONTH/DAY/YEAR

TO CREDIT DEPARTMENT

HOME LOAN APPLICATION FORM

|   | CONTENT OF APPLICATION |
|---|---|
|   |   |
|   |   |
|   |   |

NAME                              SEAL

| DOCUMENT ID | ELEMENT ID | CONTENT OF ELEMENT | POSITION INFORMATION |
|---|---|---|---|
| 001 | 001 | FORM A-1 | x = , y = |
| | 004 | EDUCATIONAL ENDOWMENT INSURANCE APPLICATION FORM | x = , y = |
| 002 | 001 | FORM A-1 | x = , y = |
| | 004 | CAR LOAN APPLICATION FORM | x = , y = |
| 003 | 001 | FORM A-1 | x = , y = |
| | 004 | HOME LOAN APPLICATION FORM | x = , y = |
| 004 | 001 | FORM A-01 | x = , y = |
| | 004 | HOME LOAN APPLICATION FORM | x = , y = |
| 005 | 001 | FORM 3B-1 | x = , y = |
| | 004 | HOME LOAN APPLICATION FORM | x = , y = |

FIG. 7

| DOCUMENT ID | ELEMENT ID | CONTENT OF ELEMENT | POSITION INFORMATION |
|---|---|---|---|
| 001 | 001 ● | FORM A-1 | x = , y = |
| | 004 ○ | EDUCATIONAL ENDOWMENT INSURANCE APPLICATION FORM | x = , y = |
| 002 | 001 ● | FORM A-1 | x = , y = |
| | 004 ○ | CAR LOAN APPLICATION FORM | x = , y = |
| 003 | 001 ● | FORM A-1 | x = , y = |
| | 004 ● | HOME LOAN APPLICATION FORM | x = , y = |
| 004 | 001 ○ | FORM A-01 | x = , y = |
| | 004 ● | HOME LOAN APPLICATION FORM | x = , y = |
| 005 | 001 ○ | FORM 3B-1 | x = , y = |
| | 004 ● | HOME LOAN APPLICATION FORM | x = , y = |

○ = UNIQUE ELEMENT   ● = COMMON ELEMENT

| ELEMENT ID | CONTENT OF ELEMENT | POSITION INFORMATION |
|---|---|---|
| 001 | FORM A-1 | x = , y = |
| 002 | FILING DATE MONTH/DAY/YEAR | x = , y = |
| 003 | TO CREDIT DEPARTMENT | x = , y = |
| 004 | HOME LOAN APPLICATION FORM | x = , y = |
| 005 | CONTENT OF APPLICATION | x = , y = |
| 006 | NAME         SEAL | x = , y = |

FIG. 12

| ELEMENT ID | CONTENT OF ELEMENT | POSITION INFORMATION |
|---|---|---|
| 001 | FO    A-1 | x = , y = |
| 002 | FILING      MONTH/DAY/YEAR | x = , y = |
| 003 | TO CREDIT DEPARTMENT | x = , y = |
| 004 | HOME LOAN APPLICAT    FORM | x = , y = |
| 005 | CONTENT OF APPLICATION | x = , y = |
| 006 | NA      TARO FUJI | x = , y = |

FIG. 13

| DOCUMENT ID | ELEMENT ID | CONTENT OF ELEMENT | POSITION INFORMATION |
|---|---|---|---|
| 001 | 001 | FORM A-1 | x = , y = |
| | 002 | FILING DATE MONTH/DAY/YEAR | x = , y = |
| | 003 | TO CREDIT DEPARTMENT | x = , y = |
| | 004 | HOME LOAN APPLICATION FORM | x = , y = |
| | 005 | CONTENT OF APPLICATION | x = , y = |

| DOCUMENT ID | ELEMENT ID | CONTENT OF ELEMENT | POSITION INFORMATION |
|---|---|---|---|
| 001 | 001 ○ | FORM A-100 | x = , y = |
| | 004 ○ | EDUCATIONAL ENDOWMENT INSURANCE APPLICATION FORM | x = , y = |
| | 005 ● | CONTENT OF APPLICATION | x = , y = |
| 002 | 001 ● | FORM A-1 | x = , y = |
| | 004 ○ | CAR LOAN APPLICATION FORM | x = , y = |
| | 005 ● | CONTENT OF APPLICATION | x = , y = |
| 003 | 001 ● | FORM A-1 | x = , y = |
| | 004 ● | HOME LOAN APPLICATION FORM | x = , y = |
| | 005 ● | CONTENT OF APPLICATION | x = , y = |
| 004 | 001 ○ | FORM A-01 | x = , y = |
| | 004 ● | HOME LOAN APPLICATION FORM | x = , y = |
| | 005 ● | CONTENT OF APPLICATION | x = , y = |
| 005 | 001 ○ | FORM 3B-1 | x = , y = |
| | 004 ● | HOME LOAN APPLICATION FORM | x = , y = |
| | 005 ○ | CONTENT | x = , y = |

○ = UNIQUE ELEMENT　● = COMMON ELEMENT

FIG. 17

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-192960 filed Sep. 30, 2015 and Japanese Patent Application No. 2015-208927 filed Oct. 23, 2015.

BACKGROUND

Technical Field

The present invention relates to an information processing apparatus, an information processing method, and a non-transitory computer readable medium.

SUMMARY

According to an aspect of the invention, there is provided an information processing apparatus including an acquiring unit, an extraction unit, and a selection unit. The acquiring unit acquires, for multiple documents, candidates for elements representing characteristics of each of the multiple documents. The extraction unit extracts, from the candidates acquired by the acquiring unit, common elements common to two or more of the multiple documents. The selection unit extracts, from the multiple documents, a document including two or more common elements among the common elements, and determines the two or more common elements included in the extracted document to be elements representing characteristics of the document.

BRIEF DESCRIPTION OF THE DRAWINGS

Exemplary embodiments of the present invention will be described in detail based on the following figures, wherein.

DETAILED DESCRIPTION

An example of an exemplary embodiment according to the present invention will be described.

First Exemplary Embodiment

Figure 1:
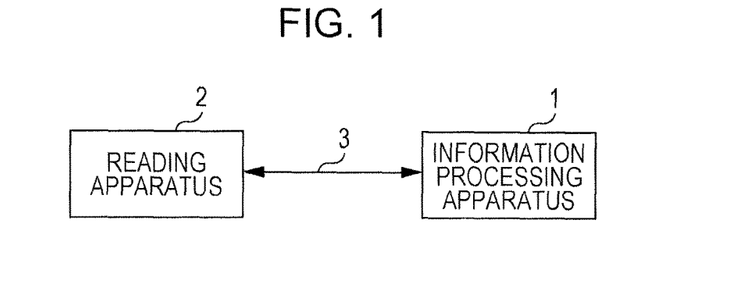
FIG. 1 is a diagram illustrating the entirety of a system according to an exemplary embodiment.

FIG. 1 is a diagram illustrating the entirety of a system according to an exemplary embodiment. An information processing apparatus 1 and a reading apparatus 2 are connected via a communication unit 3 such as a local-area network (LAN). The reading apparatus 2 reads a sample of a document, generates image data, and transmits this image data to the information processing apparatus 1. The information processing apparatus 1 extracts elements representing characteristics of the document from an image represented by the received image data. The extracted elements are used to determine the type of the document, which is used in actual paperwork.

Figure 2:
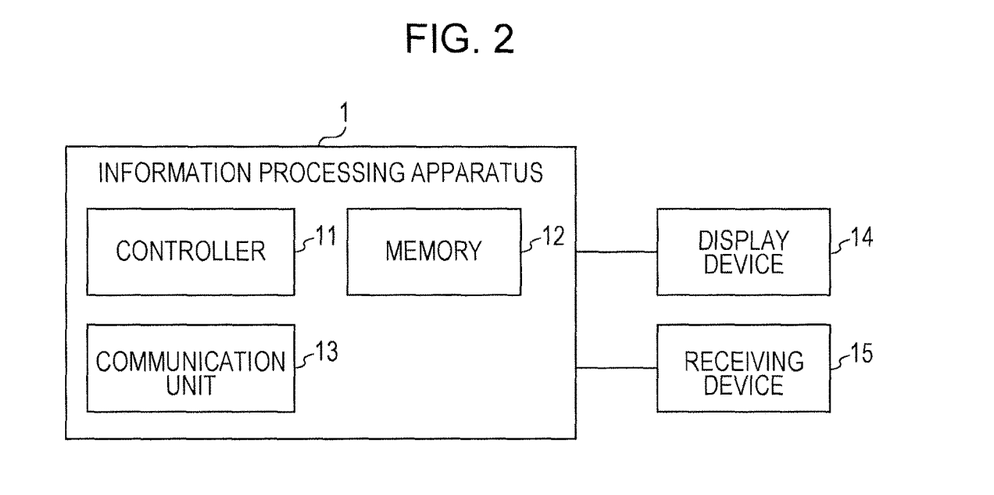
FIG. 2 is a diagram illustrating a hardware configuration of an information processing apparatus.

FIG. 2 is a diagram illustrating a hardware configuration of the information processing apparatus 1. The information processing apparatus 1 is a computer including a controller 11, a memory 12, and a communication unit 13. The controller 11 includes an arithmetic unit such as a central processing unit (CPU), and storage devices such as a read-only memory (ROM) and a random-access memory (RAM). The ROM stores firmware programs in which the procedure of starting up of a hardware device and the procedure of booting of an operating system (OS) are described. The RAM is used to store data when the CPU executes calculation. The memory 12 includes, for example, a hard disk device, and stores, for example, an OS and an application program. The communication unit 13 includes a communication interface (I/F) for communicating with the reading apparatus 2. A display device 14 and a receiving device 15 are connected to the information processing apparatus 1. The display device 14 includes, for example, a liquid crystal display device, and displays, for example, a screen for an operator to operate the information processing apparatus 1. The receiving device 15 includes, for example, a keyboard and a mouse. The receiving device 15 receives an operation performed by an operator, and outputs information corresponding to the operation to the controller 11.

The reading apparatus 2 is, for example, an image scanner including a platen glass, a baffle, a light source, an optical system, an image pickup device, an arithmetic unit, and the like (not illustrated). The light source irradiates a document placed on the platen glass with light, and the light reflected by the document enters the image pickup device via the optical system. The image pickup device converts light that has entered the image pickup device into an image signal, and outputs the image signal to the arithmetic unit. The arithmetic unit generates raster image data in accordance with the image signal, and transmits this image data to the information processing apparatus 1. Note that a copier and the information processing apparatus 1 may be connected via the communication unit 3, and a document may be read using a reading device included in the copier. In addition, image data of a document may be transferred from the reading apparatus 2 to the information processing apparatus 1 using a recording medium such as a Universal Serial Bus (USB) memory.

Figure 3:
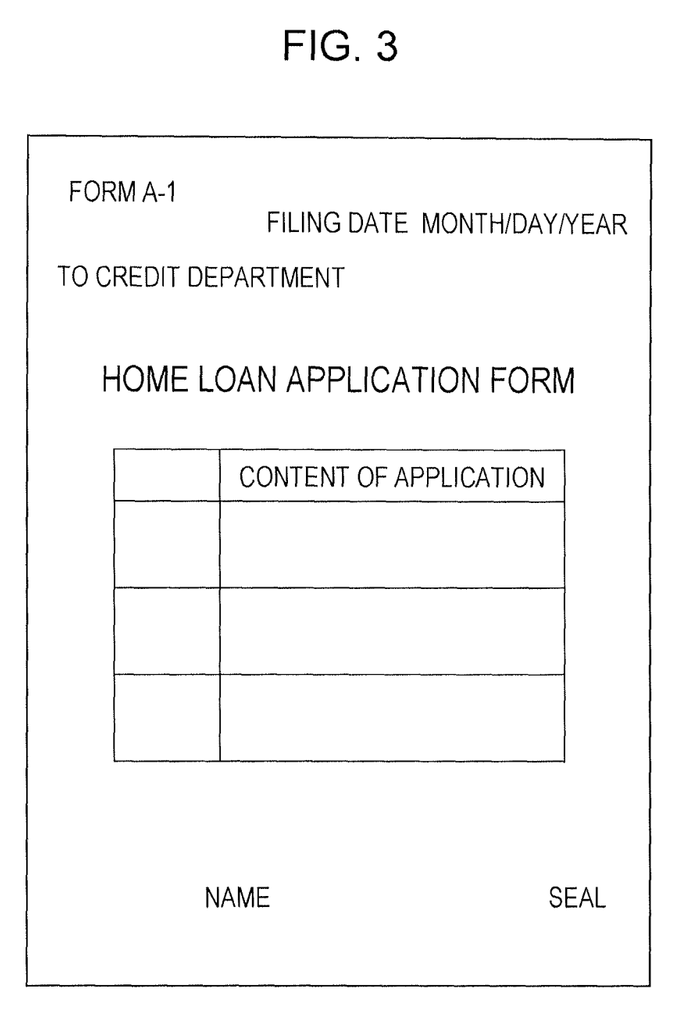
FIG. 3 is a diagram illustrating an example of a document.

FIG. 3 is a diagram illustrating an example of a document. Elements such as characters and ruled lines have already been formed on a document through for example printing. In this example, character strings of "Form A-1", "Filing Date Month/Day/Year", "To Credit Department", "Home Loan Application Form", "Content of Application", and "Name Seal" have already been formed. In addition, ruled lines indicating fields of the content of application are formed.

Figure 4:
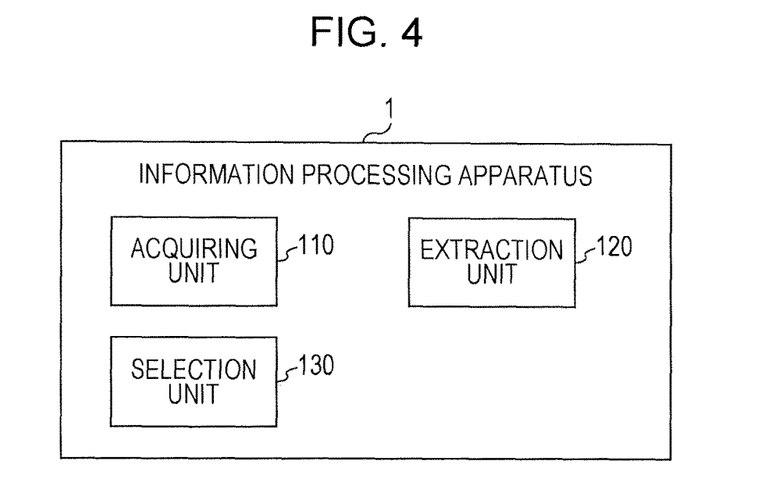
FIG. 4 is a block diagram illustrating functions of the information processing apparatus.

FIG. 4 is a block diagram illustrating functions of the information processing apparatus 1. An acquiring unit 110 acquires, for multiple documents, candidates for elements representing characteristics of each of the multiple documents. An extraction unit 120 extracts, from the candidates acquired by the acquiring unit 110, common elements that are common to two or more documents. A selection unit 130 extracts, from the multiple documents, a document including two or more common elements among the common elements extracted by the extraction unit 120, and determines the two or more common elements included in the extracted document to be elements representing characteristics of the document. In addition, the extraction unit 120 extracts, from the candidates acquired by the acquiring unit 110, unique elements that are not common to two or more documents. The selection unit 130 determines each of the unique elements extracted by the extraction unit 120 to be an element representing characteristics of a document including the unique element. A specific configuration for realizing these functions is as follows.

Figure 5:
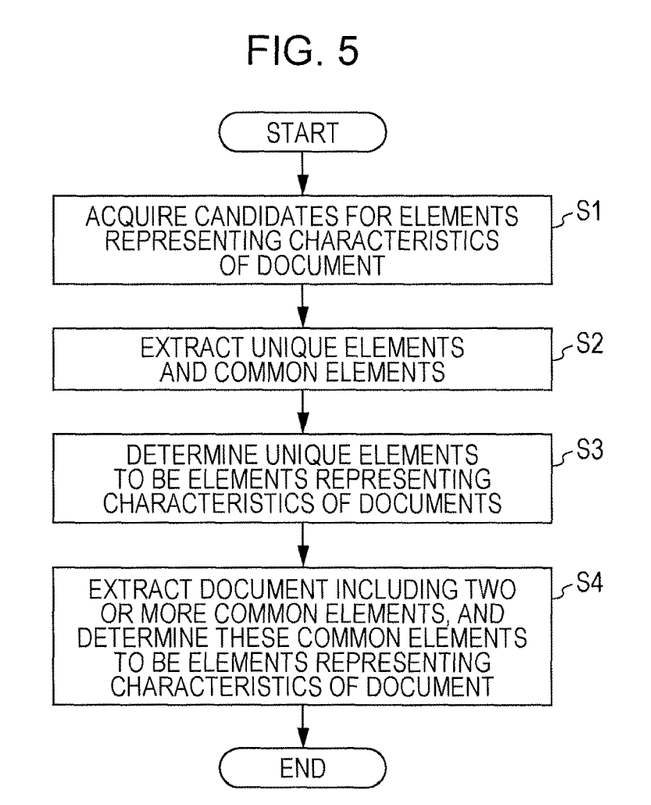
FIG. 5 is a flowchart illustrating the operation of the information processing apparatus.

FIG. 5 is a flowchart illustrating the operation of the information processing apparatus 1. An application program in which the procedure of extraction of elements representing characteristics of a document is described is installed in the information processing apparatus 1. The controller 11 of the information processing apparatus 1 executes the following process by executing this application program.

<Step S1> (Example of Acquiring Unit 110)

The controller 11 acquires candidates for elements representing characteristics of a document. Specifically, first, a user causes the reading apparatus 2 to read a sample of a document. The reading apparatus 2 reads the sample of the document, generates image data, and transmits the image data to the information processing apparatus 1. The controller 11 of the information processing apparatus 1 executes character recognition and ruled-line recognition on an image represented by the image data received from the reading apparatus 2. In the character recognition, for example, an optical character recognition (OCR) method is used. In the ruled-line recognition, for example, a method for recognizing ruled lines from a cumulative sum of values of black pixels in an X-axis direction and that in a Y-axis direction is used, the method being described in paragraph 0051 of Japanese Unexamined Patent Application Publication No. 2003-109007.

In the following description, an example is described in which candidates are acquired by performing character recognition. In the example illustrated in FIG. 3, the character strings of "Form A-1", "Filing Date Month/Day/Year", "To Credit Department", "Home Loan Application Form", "Content of Application", and "Name Seal" are recognized. In addition, the controller 11 causes the display device 14 to display an image of the document. A user specifies candidates (for example, "Form A-1" and "Home Loan Application Form") for elements representing characteristics of the document using the receiving device 15 (a mouse). The above-described process is executed on multiple documents.

Figure 6:
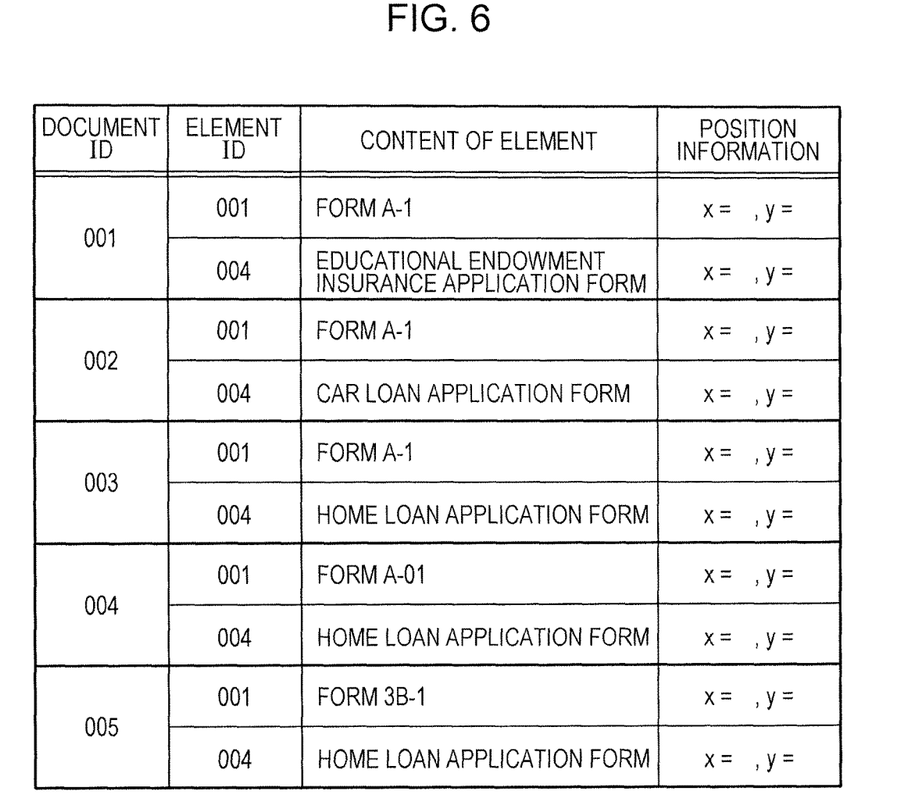
FIG. 6 is a diagram illustrating a candidate list.

FIG. 6 is a diagram illustrating a candidate list. When candidates for elements representing a document are specified, the controller 11 stores the specified candidates in the candidate list. The candidate list is a list in which a document ID, an element ID, the content of an element, and position information are associated with each other and stored. A document ID is an identifier used to identify a certain document. An element ID is an identifier used to identify a certain element. The content of an element is, in this example, a character string recognized through character recognition. Position information is information indicating the position of a certain element in a document image, and is for example the coordinates of the upper left vertex of a rectangle circumscribing a certain character string. The illustrated candidate list is an example in which, from documents of five different types, candidates for elements representing the documents are acquired. Among these, a document ID=003 corresponds to the document illustrated in FIG. 3. Note that the element ID may be assigned independently for each document, or the same element ID may be assigned to elements having the same content and different element IDs may be assigned to elements having different contents.

<Step S2> (Example of Extraction Unit 120)

Figure 7:
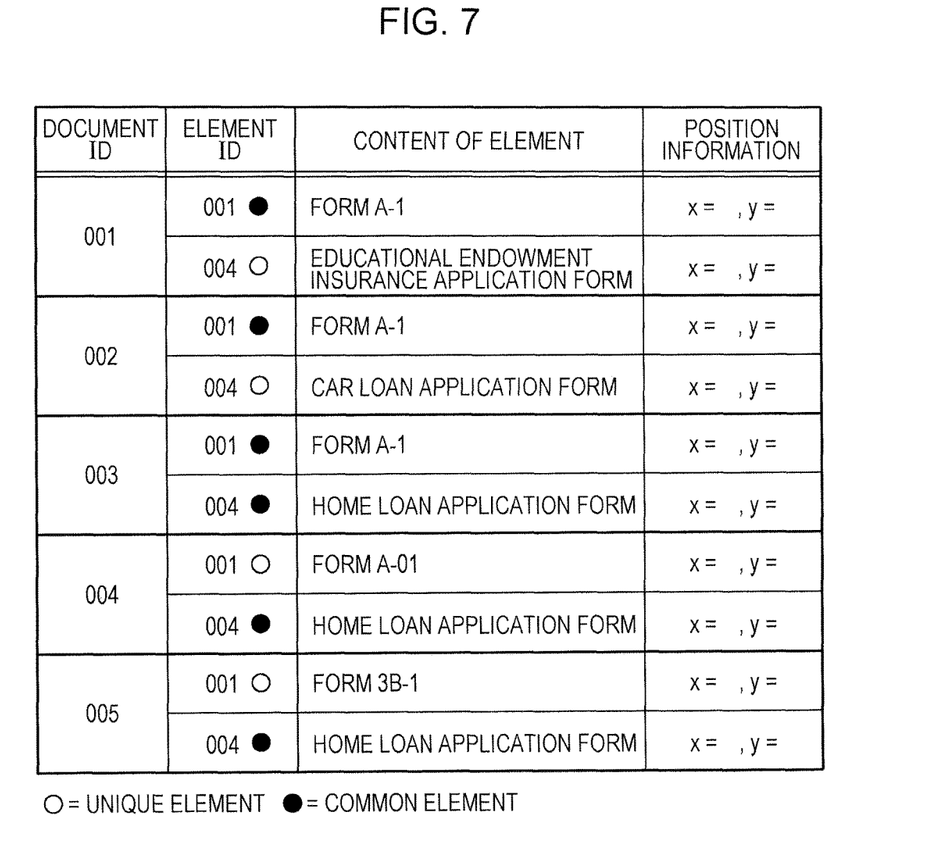
FIG. 7 is a diagram illustrating unique-element and common-element extraction results.

FIG. 7 is a diagram illustrating unique-element and common-element extraction results. The controller 11 extracts unique elements and common elements by performing comparison using the content of elements stored in the candidate list. A unique element is an element the content of which is not common to two or more documents. A common element is an element the content of which is common to two or more documents. In the drawing, elements having element IDs to which ○ is added are unique elements, and elements having element IDs to which ● is added are common elements.

<Step S3> (Example of Selection Unit 130)

The controller 11 determines each of the unique elements extracted in step S2 to be an element representing characteristics of a document including the unique element. For example, regarding a document having a document ID=001 and illustrated in FIG. 7, "Educational Endowment Insurance Application Form" (an element ID=004) is extracted as a unique element, and thus the controller 11 determines this unique element to be an element representing characteristics of this document. Likewise, regarding documents having document IDs=002, 004, and 005, the controller 11 determines extracted unique elements to be elements representing the respective documents.

<Step S4> (Example of Selection Unit 130)

The controller 11 extracts a document including two or more common elements, and determines these common elements to be elements representing characteristics of the document. In the illustrated example, "Form A-1" and "Home Loan Application Form" are extracted as common elements. Since "Form A-1" is an element common to the document IDs=001, 002, and 003, when only this element is used, the document IDs=001, 002, and 003 are not distinguished from each other. In addition, since "Home Loan Application Form" is an element common to the document IDs=003, 004, and 005, when only this element is used, the document IDs=003, 004, and 005 are not distinguished from each other. However, multiple common elements ("Form A-1" and "Home Loan Application Form") are extracted for the document ID=003 among the five documents, and the combination of these multiple common elements does not exist for the other documents. Thus, the controller 11 determines these multiple common elements to be elements representing characteristics of a document having a document ID=003.

When elements representing characteristics of each document are determined in accordance with the above-described process, the controller 11 generates a characteristic list in which the document ID of each document is associated with elements representing characteristics of the document, and causes the memory 12 to store the characteristic list.

In the present exemplary embodiment, even in the case where no unique element is extracted from a certain document, when the document includes two or more common elements, the common elements are determined to be elements representing characteristics of the document.

Second Exemplary Embodiment

The first exemplary embodiment is configured such that a user specifies candidates for elements representing characteristics of a certain document on a screen displaying an image of the document; however, in a second exemplary embodiment, an information processing apparatus 1 extracts candidates for elements representing characteristics of a document. Specifically, the second exemplary embodiment is as in the following.

Figure 8:
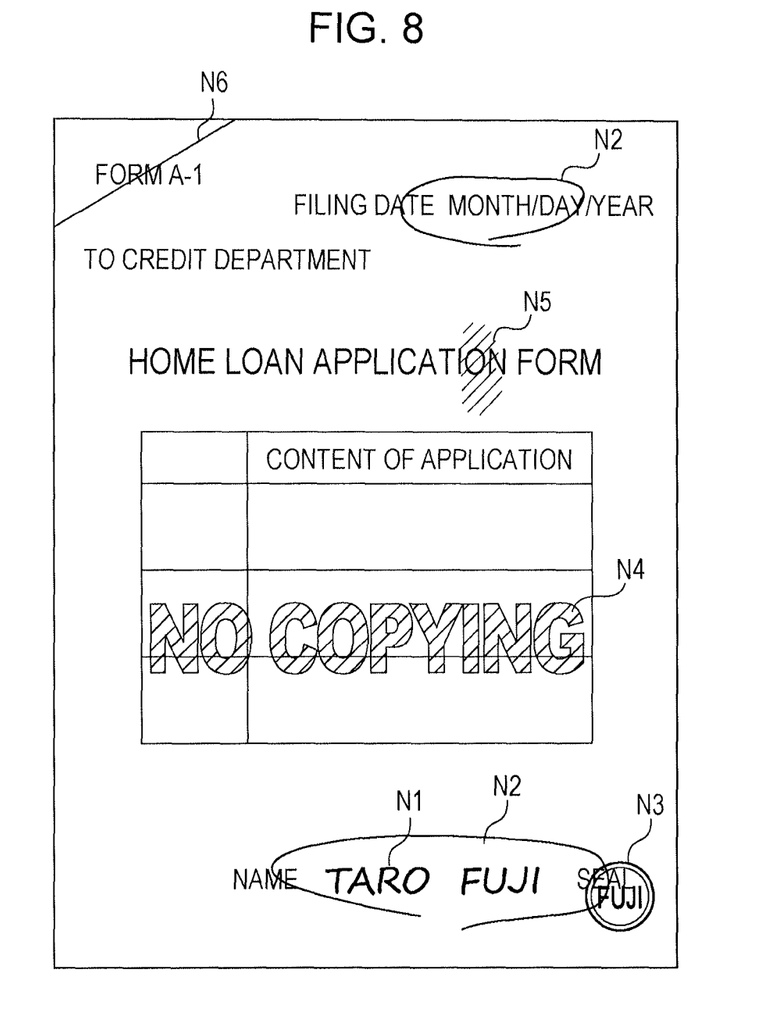
FIG. 8 is a diagram illustrating examples of noise.

FIG. 8 is a diagram illustrating examples of noise. There may be a case where noise is included in an image generated by reading a document. Noises are, for example, classified as in the following.

(a) Fill-in

Examples of a fill-in are handwritten characters and marks, an impression of a seal formed by impressing a stamp, and a mark written in pencil in order to show a section that should be filled out. In the illustrated example, a character string of "Taro Fuji" (noise N1) is handwritten in a Name field. In addition, marks (noise N2) encircling portions that should be filled out are written at a Filing Date field and the Name field. In addition, an impression of a seal (noise N3) is formed at the Name field.

(b) Watermark

There may be a case where hidden characters are set in a document so as to generate an image including a watermark when the reading apparatus 2 reads the document. A watermark is formed so as to have a certain darkness such that the watermark does not interfere with filling out and viewing of a document. To ensure viewability of a watermark itself, watermark formation is performed using for example characters in a large size, an oblique arrangement, or a regular or irregular arrangement of multiple watermarks. In the illustrated example, a watermark "No Copying" (noise N4) is formed (for the sake of drawing, hatching is used). Note that, there may also be a case where an obvious watermark is formed on a document without using hidden characters.

(c) Dirt

For example, there may be a case where dirt such as eraser debris, an ink stain, or dust clings to a document. There may also be a case where a crease or a wrinkle of a document becomes line-like dirt. There may also be a case where dirt is adhered to the platen glass of the reading apparatus 2. In the illustrated example, there are plane-like dirt (noise N5) and line-like dirt (noise N6). For the sake of drawing, hatching is used for the plane-like dirt.

(d) Show-Through

There may be a case where for example characters are formed on the reverse side of a document. For example, there may be a case where application completion instructions are described on the reverse side and a case where fields to be filled out are provided on both sides. In this manner, in the case where for example characters are described on the reverse side of a document and where a thin paper sheet is used and the characters on the reverse side show through the thin paper sheet, the characters on the reverse side may be read by the reading apparatus 2.

(e) Inclination (Skewness)

The concept of noise according to the present exemplary embodiment includes noise caused by the inclination of a document at the time of reading. For example, the inclination of a document may occur when the document is arranged at a reading position of the reading apparatus 2. In addition, in a case where a device for transporting a document to the reading position is equipped, a document may be transported with an inclined orientation. Depending on the size of this inclination, for example, characters may not be recognized, and the directions of the ruled lines may be recognized wrongly. As a result, characteristics of the document may not be accurately recognized.

Figure 9:
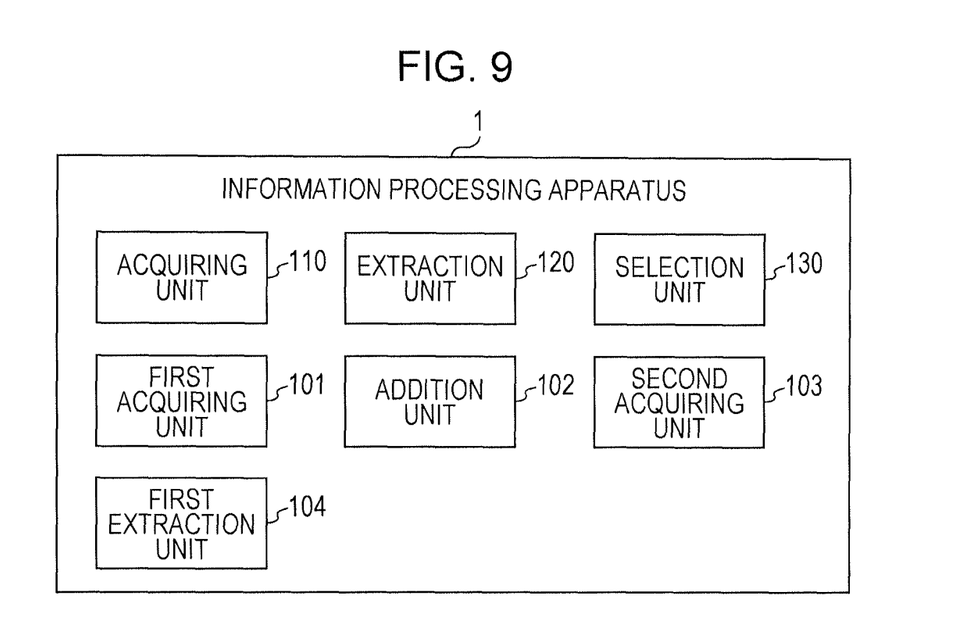
FIG. 9 is a block diagram illustrating functions of an information processing apparatus.

FIG. 9 is a block diagram illustrating functions of an information processing apparatus 1. An acquiring unit 110, an extraction unit 120, and a selection unit 130 have the same functions as those of the first exemplary embodiment. Regarding multiple documents, a first acquiring unit 101 acquires, for each of the multiple documents, a first group of elements included in a first image generated by reading the document. An addition unit 102 generates multiple second images by adding noises that differ from each other to the first image. A second acquiring unit 103 acquires second groups of elements included in the respective multiple second images. A first extraction unit 104 extracts candidates for elements representing characteristics of the document from the first group of elements in accordance with the degrees of similarity between elements included in the first group of elements and elements included in the multiple second groups of elements. The acquiring unit 110 acquires the candidates extracted by the first extraction unit 104. A specific configuration for realizing these functions is as follows.

Figure 10:
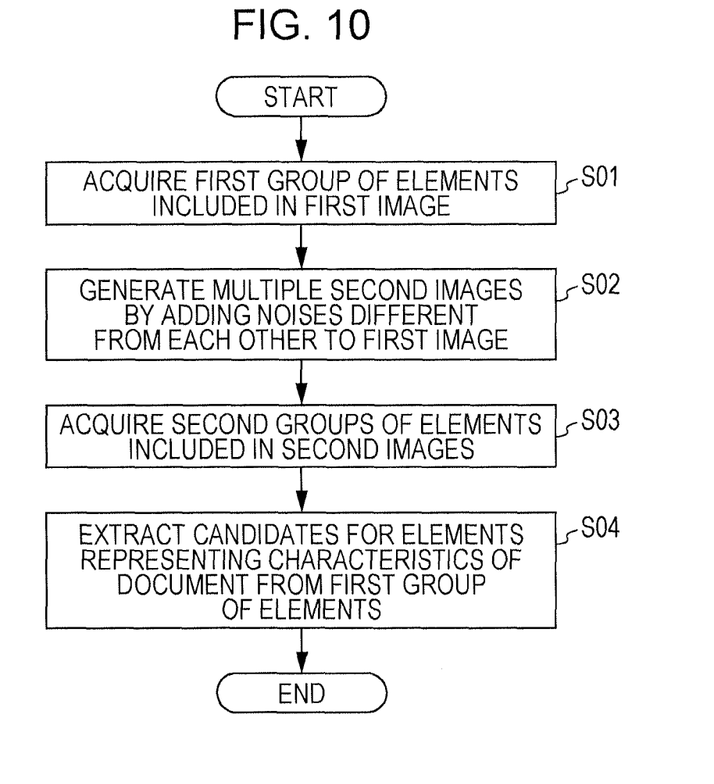
FIG. 10 is a flowchart illustrating the operation of the information processing apparatus.

FIG. 10 is a flowchart illustrating the operation of the information processing apparatus 1. An application program in which the procedure of extraction of elements representing characteristics of a document is described is installed in the information processing apparatus 1. The controller 11 of the information processing apparatus 1 executes the following process by executing this application program.

<Step S01> (Example of First Acquiring Unit 101)

First, a user causes the reading apparatus 2 to read a sample of a document. The reading apparatus 2 reads the sample of the document, generates first image data, and transmits the first image data to the information processing apparatus 1. The controller 11 of the information processing apparatus 1 executes character recognition and ruled-line recognition on a first image represented by the first image data received from the reading apparatus 2. In the character recognition, for example, an OCR method is used. In the ruled-line recognition, for example, a method for recognizing ruled lines from a cumulative sum of values of black pixels in an X-axis direction and that in a Y-axis direction is used, the method being described in paragraph 0051 of Japanese Unexamined Patent Application Publication No. 2003-109007. The present exemplary embodiment shows an example in which character strings are acquired as a first group of elements. In the example illustrated in FIG. 3, the character strings of "Form A-1", "Filing Date Month/Day/Year", "To Credit Department", "Home Loan Application Form", "Content of Application", and "Name Seal" are recognized. The controller 11 acquires these character strings as a first group of elements.

Figure 11:
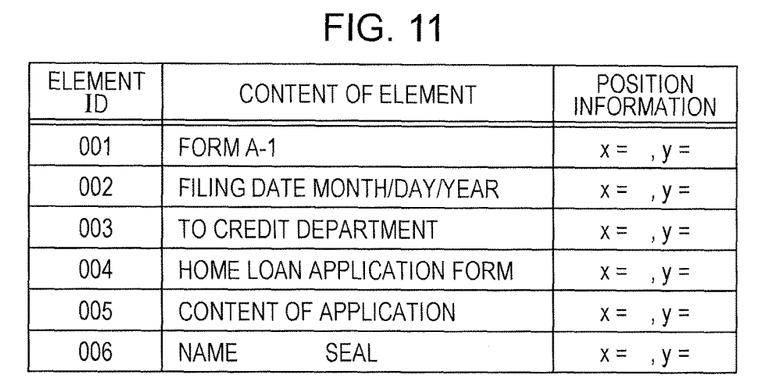
FIG. 11 is a diagram illustrating a list regarding a first group of elements.

FIG. 11 is a diagram illustrating a list regarding a first group of elements. Upon acquiring the first group of elements, the controller 11 generates a list regarding the first group of elements (hereinafter referred to as a first-group-of-elements list). The first-group-of-elements list is a list in which, for element IDs, each of the element IDs, the content of an element, and position information are associated with each other and stored. An element ID is an identifier used to identify a certain element. The content of an element is, in this example, a character string recognized through character recognition. Position information is information indicating the position of a certain element in the first image, and is for example the coordinates of the upper left vertex of a rectangle circumscribing a certain character string.

<Step S02> (Example of Addition Unit 102)

The controller 11 adds noises to the first image. The noises to be added are for example the above-described (a) fill-in, (b) watermark, (c) dirt, (d) show-through, and (e) inclination. Characters assumed to show through may be a mirror image or may not be a mirror image. The memory 12 stores initial values of the noises. The initial values of the noises are, for example, the number of characters and the number of lines for (a), the area of a character string for (b), the area of an area covered with dirt for (c), the area of a show-through area for (d), and an inclination angle for (e). In addition, for example, for each element included in the first group of elements (a character string in the present exemplary embodiment), the percentage of the area of an area covered with a certain noise to a rectangle circumscribing the element may also be determined as one of initial values of the noise.

The controller 11 generates multiple second images by adding these noises to the first image. Here, the controller 11 performs control such that noises that differ from each other are to be included in the respective second images. For example, a position to which noise is added in a rectangle circumscribing a certain element may be changed from second image to second image using random numbers. In addition, for example, the area of an area covered with a certain noise in a rectangle circumscribing a certain element or the percentage of the area of an area covered with a certain noise to the area of a rectangle circumscribing an element may also be changed from second image to second image using random numbers. In short, the controller 11 generates in step S02 multiple second images by randomly changing noises, which are predetermined multiple types of noise, from second image to second image. The image illustrated in FIG. 8 is one of the multiple second images. The multiple second images differ from each other in terms of the areas, positions, and the like of the noises N1 to N6.

<Step S03> (Example of Second Acquiring Unit 103)

Similarly to as in step S01, the controller 11 executes character recognition on each of the second images, recognizes character strings, and acquires the recognized character strings as second groups of elements. Since characters to which noise is added are not recognized, character strings of "Fo A-1", "Filing Month/Day/Year", "To Credit Department", "Home Loan Applicat Form", "Content of Application", and "Na Taro Fuji" are recognized in the example illustrated in FIG. 8. The controller 11 acquires these character strings as a second group of elements. Note that, as described above, the multiple second images differ from each other in terms of the areas, positions, and the like of the noises. Thus, for example, since noise is added to "ion" of "Home Loan Application Form", "ion" is not recognized in the example illustrated in FIG. 8. If noise is added to other characters, the characters are not recognized. As a result, the second group of elements to be acquired differs from second image to second image. The controller 11 acquires the second groups of elements from the respective multiple second images. Thus, the number of the second groups of elements to be acquired is the same as the number of the second images.

Figure 12:
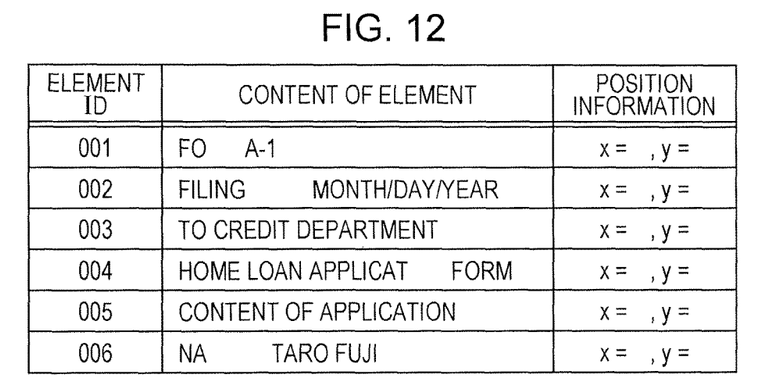
FIG. 12 is a diagram illustrating a list regarding a second group of elements.

FIG. 12 is a diagram illustrating a list regarding a second group of elements. Upon acquiring a second group of elements, the controller 11 generates a list regarding the second group of elements (hereinafter referred to as a second-group-of-elements list). The second-group-of-elements list is a list in which, for element IDs, each of the element IDs, the content of an element, and position information are associated with each other and stored. The number of second-group-of-elements lists to be generated is the same as the number of the second images.

<Step S04> (Example of First Extraction Unit 104)

The controller 11 reads out elements corresponding to the same element ID from the first-group-of-elements list and the second-group-of-elements list, and calculates the degree of similarity between the two elements. In the case of a character string, the degree of similarity is the percentage of the number of matching characters to the total number of characters of the character string. For example, for an element ID=004, since the first-group-of-elements list has "Home Loan Application Form" and the second-group-of-elements list has "Home Loan Applicat Form", the degree of similarity is approximately 0.870.

The controller 11 performs this processing for all the second-group-of-elements lists, and calculates the average of the degrees of similarity for each element ID. For example, when the contents of elements having an element ID=004 acquired from the five second images are "Home Loan Applicat Form", "Home Loan cation Form", "Home Loan Applic Form", "Home Loan Application Form", and "Home Loan Ap Form", the average of the degrees of similarity for the element ID=004 is approximately (0.870+0.783+0.783+1.0+0.609)/5=0.809. When the average of the degrees of similarity for a certain element reaches a predetermined threshold, the controller 11 determines the element to be an element representing characteristics of the document. For example, in the case where the threshold is 0.4, the average of the degrees of similarity for an element having an element ID=004 exceeds the threshold, and thus the element is determined to be an element representing characteristics of the document. Note that the above-described process may also be performed using, instead of the average of the degrees of similarity, a value based on the degrees of similarity such as the maximum value or the minimum value of the degrees of similarity.

Figure 13:
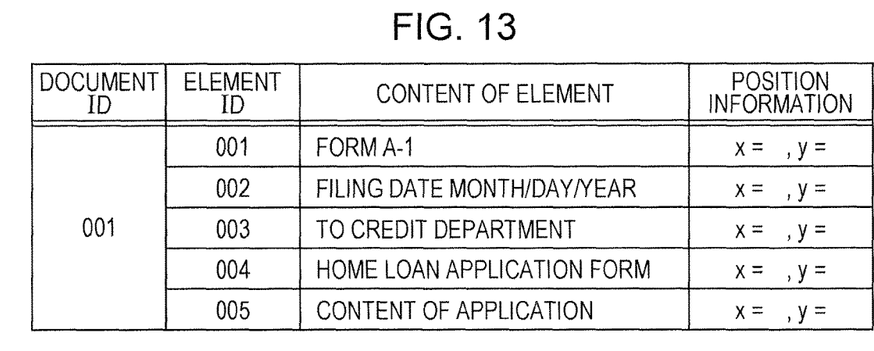
FIG. 13 is a diagram illustrating a candidate list.

FIG. 13 is a diagram illustrating a candidate list. When the above-described processing is completed for all the element IDs, the controller 11 generates a candidate list. The candidate list is a list in which, for element IDs of elements representing characteristics of the document, each of the element IDs, the content of an element, and position information are associated with each other and stored. In this example, the average of the degrees of similarity for "Name Seal" having an element ID=006 does not reach the threshold, and thus the elements having element IDs=001 to 005 are extracted as elements representing characteristics of the document. The controller 11 generates candidate lists for respective documents. The controller 11 generates a document ID, which is an identifier used to identify a generated candidate list, and associates the document ID with the candidate list. In this example, the generated candidate list is associated with a document ID=001. As described above, the elements representing characteristics of the document are extracted from the first group of elements. Note that the display device 14 may be caused to display an image representing an extraction result of elements representing characteristics of the document. For example, the display device 14 may be caused to display the generated candidate list. The display device 14 may also be caused to display an image representing a document, in the image the elements extracted as elements representing characteristics of the document being visually emphasized.

The description above is about the configuration of the information processing apparatus 1 for extracting candidates for elements representing characteristics of documents. A candidate list is generated for each of the multiple documents in accordance with this procedure, and elements representing each document are extracted and a characteristic list is generated in accordance with the process described in the first exemplary embodiment.

Third Exemplary Embodiment

Figure 14:
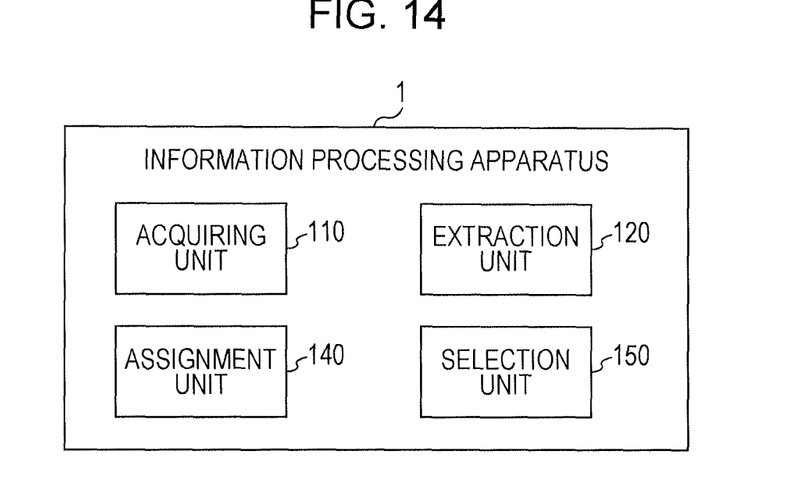
FIG. 14 is a block diagram illustrating functions of an information processing apparatus.

FIG. 14 is a block diagram illustrating functions of an information processing apparatus 1. An acquiring unit 110 and an extraction unit 120 have the same functions as those of the first exemplary embodiment. The acquiring unit 110 acquires, for multiple documents, candidates for elements representing characteristics of each of the multiple documents. The extraction unit 120 extracts, from the candidates acquired by the acquiring unit 110, unique elements that are not common to two or more documents and common elements that are common to two or more documents. An assignment unit 140 assigns, for each of the multiple documents, priority ranks to unique elements and common elements included in the document, the priority ranks being used in determination of the type of the document. For each of the multiple documents, a selection unit 150 determines, in accordance with the priority ranks assigned by the assignment unit 140, at least one of the unique elements and the common elements to be an element representing characteristics of the document. A specific configuration for realizing these functions is as follows.

Figure 15:
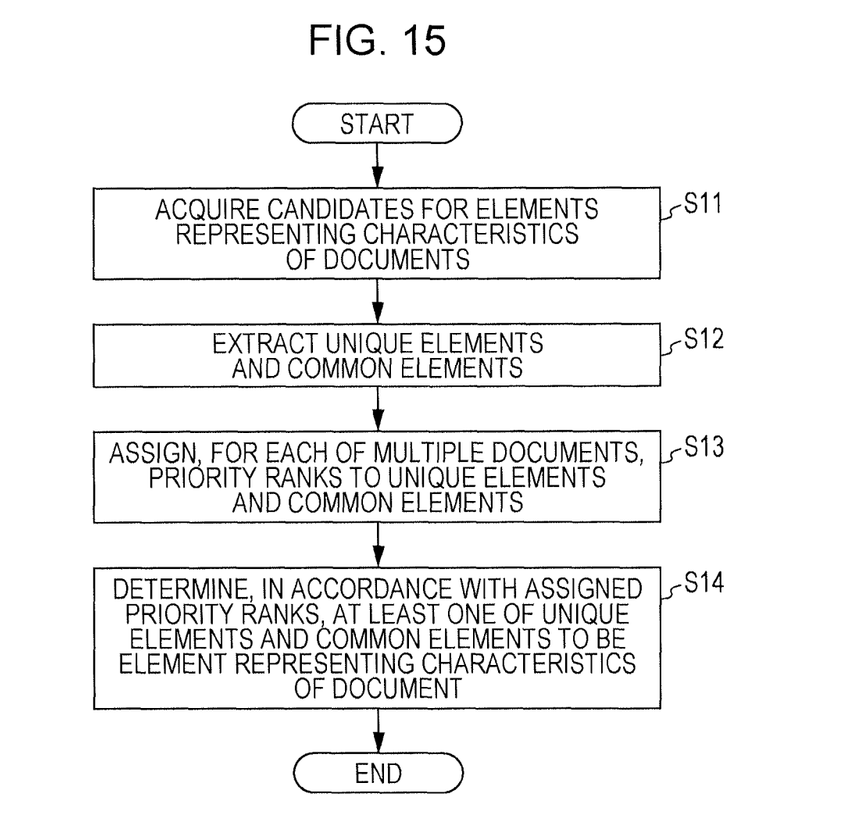
FIG. 15 is a flowchart illustrating the operation of the information processing apparatus.

FIG. 15 is a flowchart illustrating the operation of the information processing apparatus 1. An application program in which the procedure of extraction of elements representing characteristics of a document is described is installed in the information processing apparatus 1. The controller 11 of the information processing apparatus 1 executes the following process by executing this application program.

<Step S11> (Example of Acquiring Unit 110)

For multiple documents, the controller 11 acquires candidates for elements representing characteristics of each of the multiple documents. Specifically, the controller 11 generates a candidate list by performing the same processing as in step S1 of the first exemplary embodiment (see FIG. 6).

<Step S12> (Example of Extraction Unit 120)

The controller 11 extracts, from the candidates acquired by the acquiring unit 110, unique elements that are not common to two or more documents and common elements that are common to two or more documents. Specifically, the controller 11 extracts unique elements and common elements by performing the same processing as in step S2 of the first exemplary embodiment (see FIG. 7).

<Step S13> (Example of Assignment Unit 140)

The controller 11 assigns, for each of the multiple documents, priority ranks to unique elements and common elements included in the document, the priority ranks being used in determination of the type of the document. Specifically, the controller 11 assigns a higher priority rank to a unique element than to a common element. For example, in the example of FIG. 7 (○=unique element, ●=common element), regarding a document having a document ID=001, the first priority rank is assigned to an element having an element ID=004, and the second priority rank is assigned to an element having an element ID=001. A document having a document ID=003 has no unique element, and both of two candidates are common elements. Thus, the first priority rank is assigned to both of the two candidates.

<Step S14> (Example of Selection unit 150)

For each of the multiple documents, the controller 11 determines, in accordance with the priority ranks assigned by the assignment unit 140, at least one of the unique elements and the common elements to be an element representing characteristics of the document. As an example, in the present exemplary embodiment, the controller 11 determines only a unique element to be an element representing characteristics of the document. Regarding the document having a document ID=001 in the example of FIG. 7, only the element having an element ID=004 is determined to be an element representing characteristics of this document. Regarding the document having a document ID=003, similarly to as in the first exemplary embodiment, the two common elements may also be determined to be elements representing characteristics of this document.

Implementation Example

Next, an implementation example of a document process using characteristic lists generated in accordance with the procedures described in the first to third exemplary embodiments will be described. The memory 12 stores multiple characteristic lists generated in accordance with the above-described procedure. These characteristic lists are associated with respective document IDs, which differ from each other. First, a user causes the reading apparatus 2 to read a document. This document is, for example, the document illustrated in FIG. 3 (Home Loan Application Form) on which necessary sections are filled out by an applicant for a home loan. The reading apparatus 2 reads this document, generates third image data, and transmits the third image data to the information processing apparatus 1. The controller 11 of the information processing apparatus 1 executes character recognition on a third image represented by the third image data received from the reading apparatus 2, acquires recognized character strings as a third group of elements, and generates a list regarding the third group of elements (hereinafter referred to as a third-group-of-elements list). The configuration of the third-group-of-elements list is substantially the same as that of the above-described first-group-of-elements list.

The controller 11 reads out, from certain characteristic lists, elements corresponding to pieces of position information about the elements included in the third-group-of-elements list, and calculates the degrees of similarity between the elements included in the third-group-of-elements list and the elements read out from the characteristic lists (regarding the definition of the degree of similarity, see step S04 of the second exemplary embodiment). Note that for each of the elements included in the third-group-of-elements list, when the characteristic list does not include an element corresponding to the position information about the element included in the third-group-of-elements list, the degree of similarity for the element is 0.0. The controller 11 calculates, for each characteristic list, a point in accordance with the degrees of similarity for the elements included in the characteristic list, and extracts a characteristic list whose point is greater than or equal to a threshold and is the highest.

The memory 12 is provided with a directory for storing the third image data. In the layer immediately below this directory, multiple directories associated with respective document IDs and one directory that is not associated with any document ID (a directory for unknown documents) are provided. The controller 11 stores the third image data in a directory associated with the document ID of the extracted characteristic list. In the case where the points of all the characteristic lists do not reach the threshold, the controller 11 stores the third image data in the directory for unknown documents. The type of the document is determined in this manner.

<Modification>

The exemplary embodiments may be modified as follows. In addition, multiple modifications may be combined.

<First Modification>

In the case where a unique element's tolerance of noise does not satisfy predetermined conditions and where multiple common elements are extracted, a combination of the unique element and the multiple common elements may also be determined to be elements representing characteristics of a document. Specifically, in the case where a candidate extracted by using the technique according to the second exemplary embodiment is extracted as a unique element, the average of the degrees of similarity calculated in step S04 of the second exemplary embodiment is compared with a threshold. This threshold is the standard value for the unique element's tolerance of noise. In the case where the average of the degrees of similarity does not reach this threshold, this unique element's tolerance of noise is insufficient. In the case where the average of the degrees of similarity does not reach the threshold, when multiple common elements are extracted, the shortage in the unique element's tolerance is compensated by combining this unique element and multiple common elements. In short, the extraction unit 120 extracts, from the candidates acquired by the acquiring unit 110, a unique element that is not common to two or more documents, and the selection unit 130 determines, in the case where the degree of similarity obtained when the unique element is extracted as a candidate by the first extraction unit 104 does not satisfy predetermined conditions, the unique element and two or more common elements to be elements representing characteristics of the document. Note that the above-described process may also be performed using, instead of the average of the degrees of similarity, a value based on the degrees of similarity such as the maximum value or the minimum value of the degrees of similarity.

<Second Modification>

The above-described exemplary embodiment has shown that, as an example, the positions or areas of noises are changed from second image to second image using random numbers. However, for example, the positions or areas of noises may be changed from second image to second image regularly. In short, any configuration may be used as long as multiple second images are generated by adding noises that differ from each other to the first image.

<Third Modification>

Elements whose tolerance of noise does not satisfy predetermined conditions may be made not to be extracted as candidates for elements representing characteristics of a document. Specifically, in step S04 of the second exemplary embodiment, the controller 11 reads out elements corresponding to the same element ID from the first-group-of-elements list and the second-group-of-elements list, and calculates the degree of similarity between the two elements. The controller 11 performs this processing for all the second-group-of-elements lists, and calculates the average of the degrees of similarity for each element ID. The controller 11 compares this average with a threshold. This threshold is the standard value for elements' tolerance of noise. In the case where the average of the degrees of similarity does not reach this threshold, this element's tolerance of noise is insufficient, and thus the controller 11 does not extract this element as a candidate for an element representing characteristics of the document. In short, from the elements included in the first group of elements, the first extraction unit 104 does not extract, as candidates for elements representing characteristics of the document, elements for which the degree of similarity does not satisfy predetermined conditions. Note that the above-described process may also be performed using, instead of the average of the degrees of similarity, a value based on the degrees of similarity such as the maximum value or the minimum value of the degrees of similarity.

According to the present modification, elements whose tolerance of noise is insufficient are not used as elements representing characteristics of a document.

<Fourth Modification>

The third exemplary embodiment may be modified as follows. In step S13 of the third exemplary embodiment (see FIG. 15), the lower the frequency of occurrence of a common element in multiple documents, the higher the priority rank the controller 11 assigns to the common element (an example of the assignment unit 140). In step S14, the controller 11 determines the unique element and a common element selected in accordance with the priority ranks assigned by the assignment unit 140 to be elements representing characteristics of the document (an example of the selection unit 150). Specifically, the fourth modification is as in the following.

Figure 16:
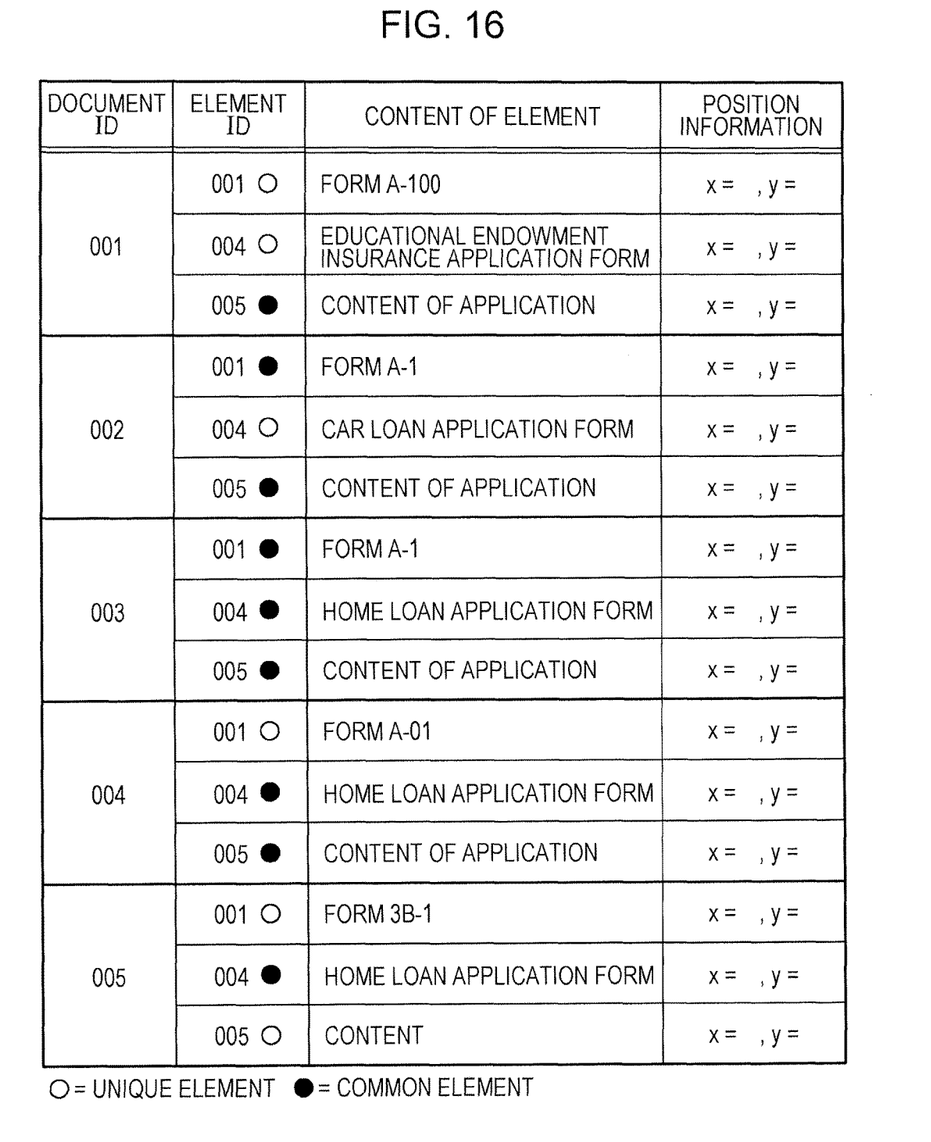
FIG. 16 is a diagram illustrating a candidate list.

FIG. 16 is a diagram illustrating an example of a candidate list. "Form A-1" having an element ID=001 is a common element common to two documents (document IDs=002 and 003) (the frequency of occurrence=2). "Home Loan Application Form" having an element ID=004 is a common element common to three documents (document IDs=003, 004, and 005) (the frequency of occurrence=3). "Content of Application" having an element ID=005 is a common element common to four documents (document IDs=001, 002, 003, and 004) (the frequency of occurrence=4).

For example, in the case of a document having a document ID=002, a unique element is "Car Loan Application Form" having an element ID=004, and common elements are "Form A-1" having an element ID=001 and "Content of Application" having an element ID=005. The controller 11 assigns the first priority rank to "Form A-1" having an element ID=001 (the frequency of occurrence=2), and the second priority rank to "Content of Application" having an element ID=005 (the frequency of occurrence=4). The controller 11 then determines the unique element, "Car Loan Application Form" having an element ID=004, and the common elements having the first priority rank, "Form A-1" having an element ID=001, among the common elements to be elements representing characteristics of this document.

Note that as for a document having a document ID=003, in the case where there are three or more common elements, the common elements having the first and second priority ranks may be selected. In short, according to the present modification, the unique element and a common element selected in accordance with the priority ranks are determined to be elements representing characteristics of the document.

<Fifth Modification>

The third exemplary embodiment may be modified as follows.

Figure 17:
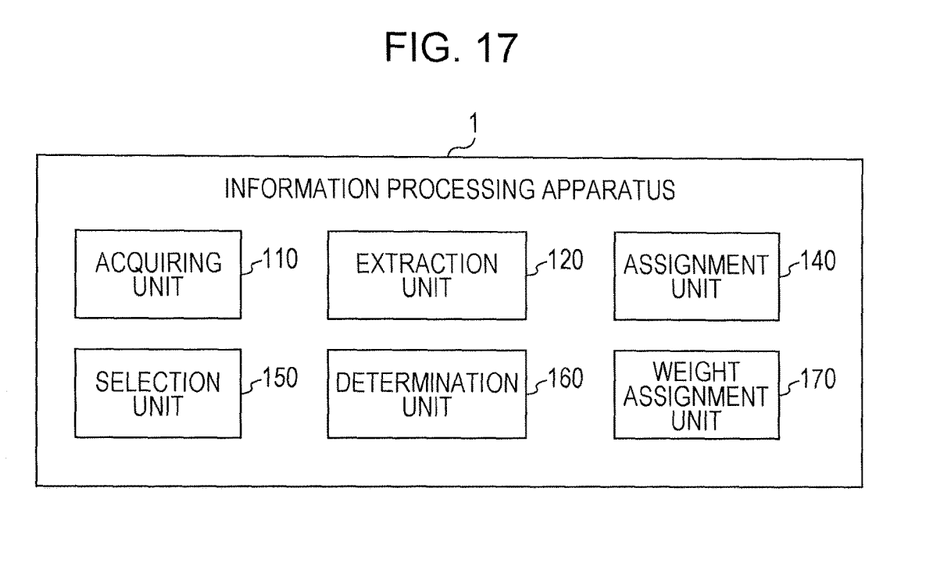
FIG. 17 is a block diagram illustrating functions of an information processing apparatus.

FIG. 17 is a block diagram illustrating functions of an information processing apparatus 1. An acquiring unit 110, an extraction unit 120, an assignment unit 140, and a selection unit 150 have the same functions as those of the third exemplary embodiment. The acquiring unit 110 acquires, for multiple documents, candidates for elements representing characteristics of each of the multiple documents. The extraction unit 120 extracts, from the candidates acquired by the acquiring unit 110, unique elements that are not common to two or more documents and common elements that are common to two or more documents. The assignment unit 140 assigns, for each of the multiple documents, priority ranks to unique elements and common elements included in the document, the priority ranks being used in determination of the type of the document. For each of the multiple documents, the selection unit 150 determines, in accordance with the priority ranks assigned by the assignment unit 140, at least one of the unique elements and the common elements to be an element representing characteristics of the document. A determination unit 160 determines the type of the document by comparing elements read from the document with elements determined by the selection unit 150. The higher the priority rank, which is assigned by the assignment unit 140, of an element, the heavier the weight a weight assignment unit 170 assigns to the element for a determination performed by the determination unit 160. A specific configuration for realizing these functions is as follows.

The specific configuration of the determination unit 160 is as described above in the implementation example. That is, the controller 11 reads out, from certain characteristic lists, elements corresponding to pieces of position information about the elements included in the third-group-of-elements list (a group of elements read out from a document by the reading apparatus 2), and calculates the degrees of similarity between the elements included in the third-group-of-elements list and the elements read out from the characteristic lists (regarding the definition of the degree of similarity, see step S04 of the second exemplary embodiment). The controller 11 calculates, for each characteristic list, a point in accordance with the degrees of similarity for the elements included in the characteristic list, and extracts a characteristic list whose point is greater than or equal to a threshold and is the highest.

The controller 11 calculates, for example, a point by summing values obtained by multiplying the degree of similarity of each element included in the characteristic list by a certain weight. Here, the higher the priority rank, which is assigned by the assignment unit 140, of an element, the greater the coefficient the controller 11 sets for the element (the weight assignment unit 170).

<Sixth Modification>

The above-described exemplary embodiments have shown that, as an example, the above-described functions are realized by the information processing apparatus 1 executing an application program. However, part or all of the above-described functions may also be implemented using hardware circuits. In addition, the application program may be recorded on a computer readable recording medium such as an optical recording medium or a semiconductor memory, and provided. The application program may be read from this computer readable recording medium and installed. In addition, this application program may also be provided through electric telecommunication lines.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to function as:
an acquiring unit that acquires, for a plurality of documents, candidates for elements representing characteristics of each of the plurality of documents;
an extraction unit that extracts, from the candidates acquired by the acquiring unit, common elements common to two or more of the plurality of documents;
a selection unit that extracts, from the plurality of documents, a document including two or more common elements among the common elements, and determines the two or more common elements included in the extracted document to be elements representing characteristics of the document;
a first acquiring unit that acquires, for each of the plurality of documents, a first group of elements included in a first image generated by reading the document;
an addition unit that generates a plurality of second images by adding noises that differ from each other to the first image;
a second acquiring unit that acquires second groups of elements included in the plurality of respective second images; and
a first extraction unit that extracts, from the first group of elements, candidates for elements representing characteristics of the document in accordance with degrees of similarity between elements included in the first group of elements and elements included in the second groups of elements.

2. The information processing apparatus according to claim 1,
wherein
the acquiring unit acquires the candidates extracted by the first extraction unit.

3. The information processing apparatus according to claim 2, wherein
the extraction unit extracts, from the candidates acquired by the acquiring unit, a unique element that is not common to two or more of the plurality of documents, and
the selection unit determines, in a case where a degree of similarity obtained when the unique element is extracted by the first extraction unit as a candidate among the candidates does not satisfy predetermined conditions, the unique element and the two or more common elements to be elements representing characteristics of the document.

4. The information processing apparatus according to claim 2,
wherein from the elements included in the first group of elements, the first extraction unit does not extract an element corresponding to a degree of similarity that does not satisfy predetermined conditions as a candidate for an element representing characteristics of the document.

5. The information processing apparatus according to claim 1, wherein
the extraction unit extracts, from the candidates acquired by the acquiring unit, a unique element that is not common to two or more of the plurality of documents, and
the selection unit determines the unique element to be an element representing characteristics of a document including the unique element.

6. A non-transitory computer readable medium storing a program causing a computer to execute a process, the process comprising:
acquiring, for a plurality of documents, candidates for elements representing characteristics of each of the plurality of documents;
extracting, from the candidates acquired in the acquiring, common elements common to two or more of the plurality of documents;
extracting, from the plurality of documents, a document including two or more common elements among the common elements;
determining the two or more common elements included in the extracted document to be elements representing characteristics of the document;
acquiring, for each of the plurality of documents, a first group of elements included in a first image generated by reading the document;
generating a plurality of second images by adding noises that differ from each other to the first image;
acquiring second groups of elements included in the plurality of respective second images; and
extracting, from the first group of elements, candidates for elements representing characteristics of the document in accordance with degrees of similarity between elements included in the first group of elements and elements included in the second groups of elements.

* * * * *